Oct. 23, 1951          C. K. WILSON          2,572,084
WELDING ELECTRODE HOLDER CONSTRUCTION
Filed Dec. 7, 1948          5 Sheets—Sheet 1
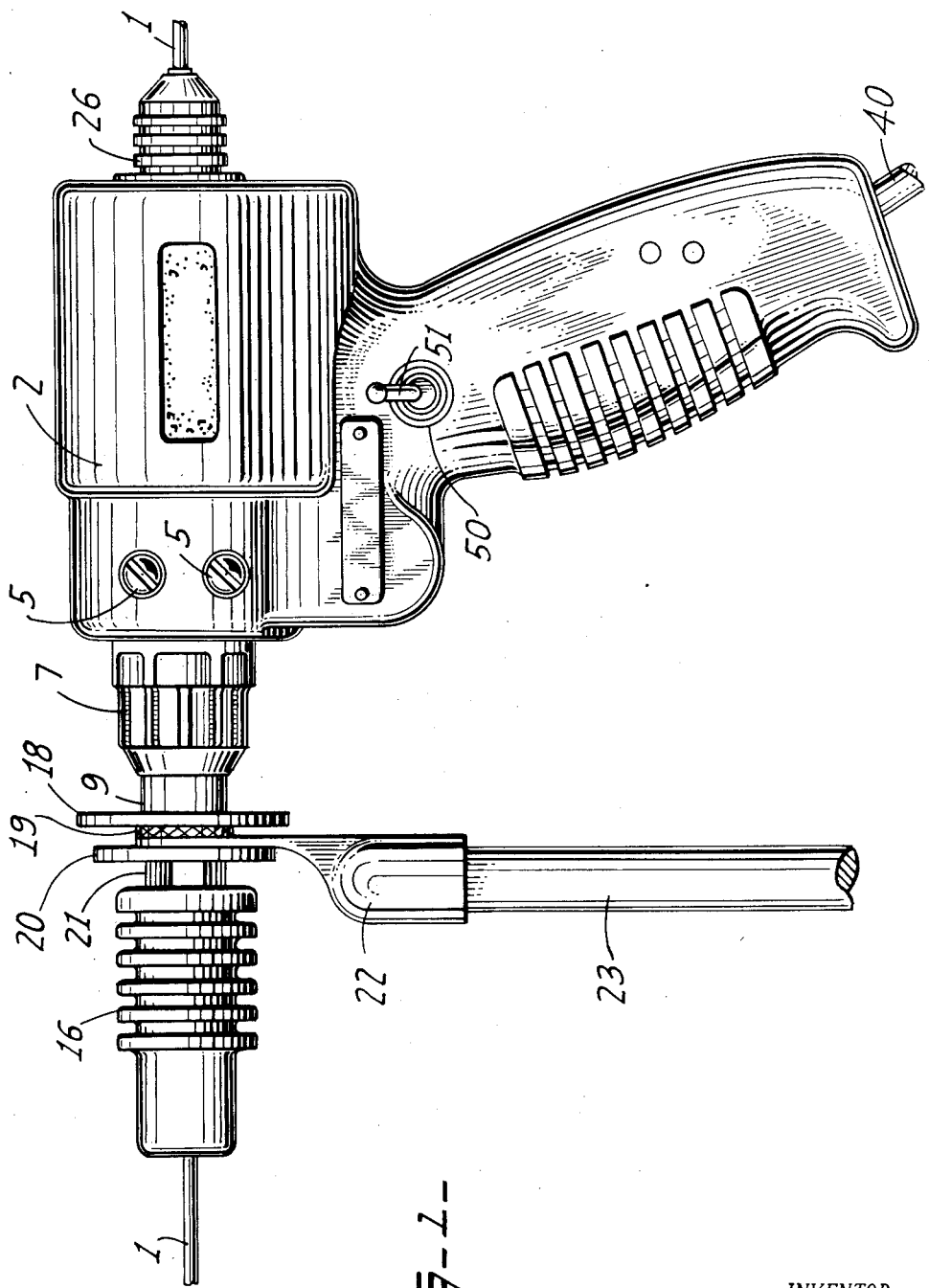
INVENTOR.
Charles K. Wilson

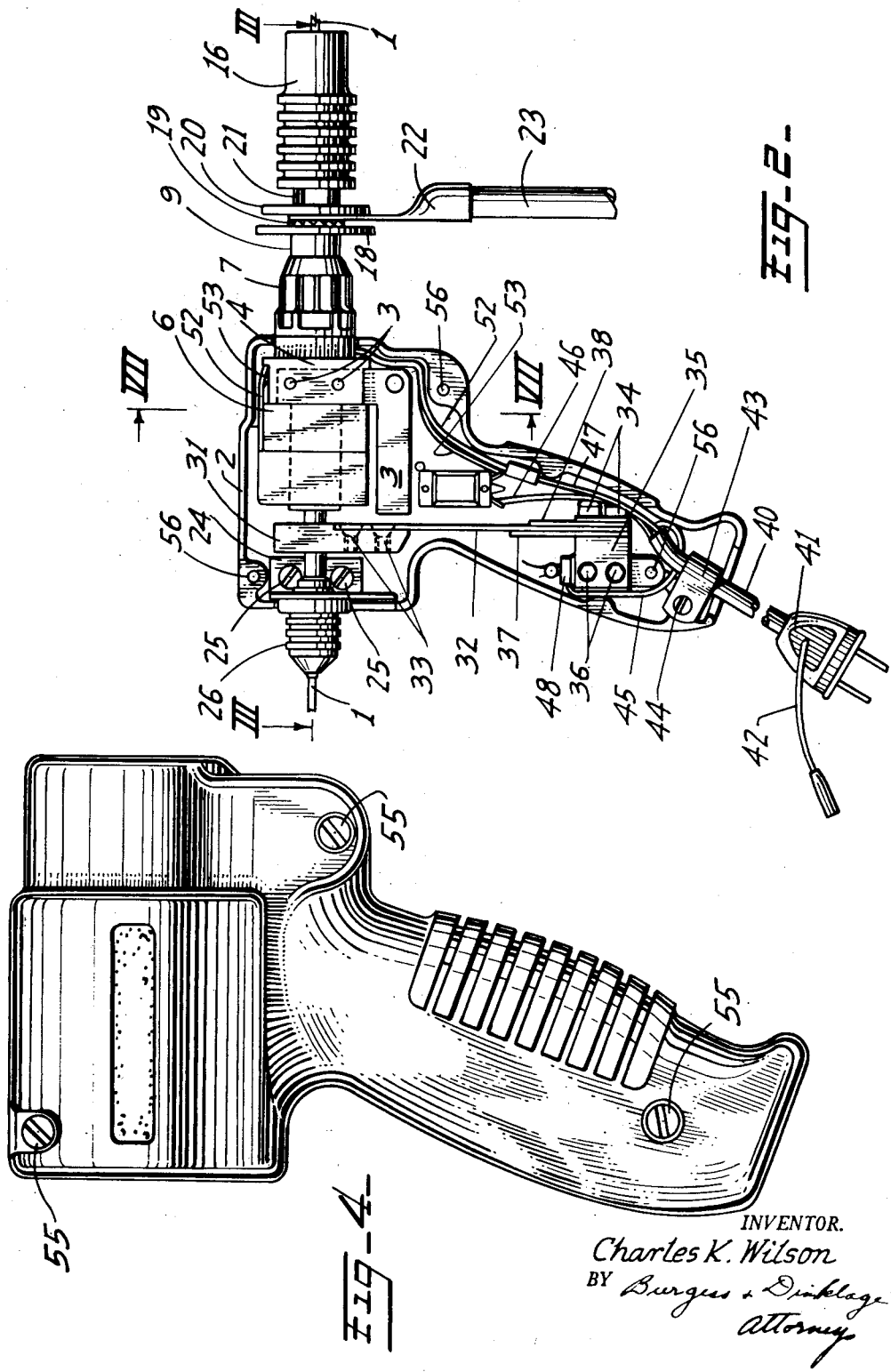

Oct. 23, 1951        C. K. WILSON        2,572,084

WELDING ELECTRODE HOLDER CONSTRUCTION

Filed Dec. 7, 1948        5 Sheets-Sheet 3

INVENTOR.
Charles K. Wilson
BY Burgess & Dinklage
Attorneys

Oct. 23, 1951  C. K. WILSON  2,572,084
WELDING ELECTRODE HOLDER CONSTRUCTION
Filed Dec. 7, 1948  5 Sheets-Sheet 4
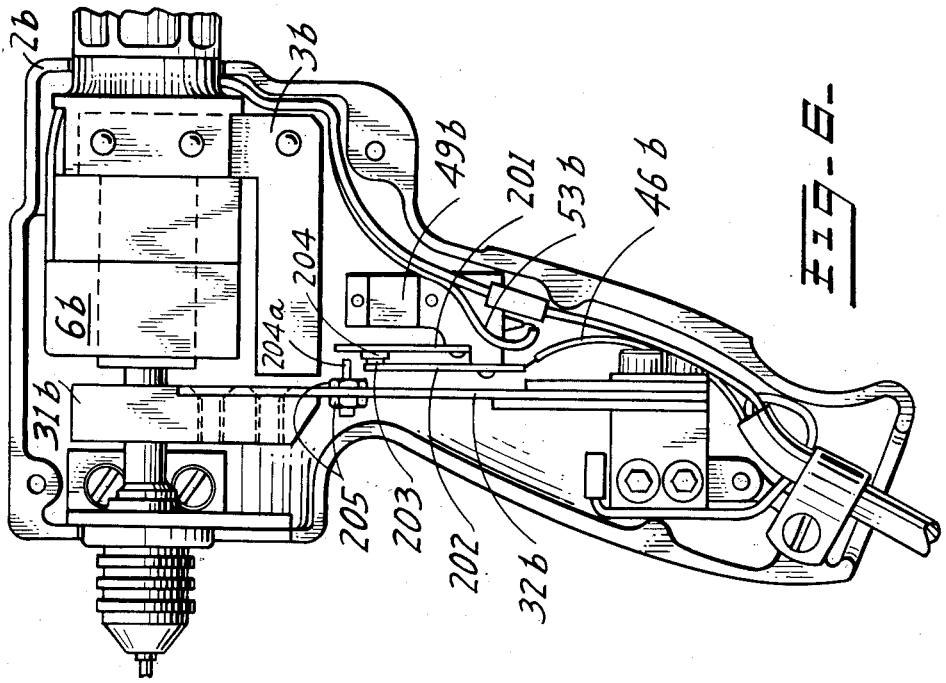
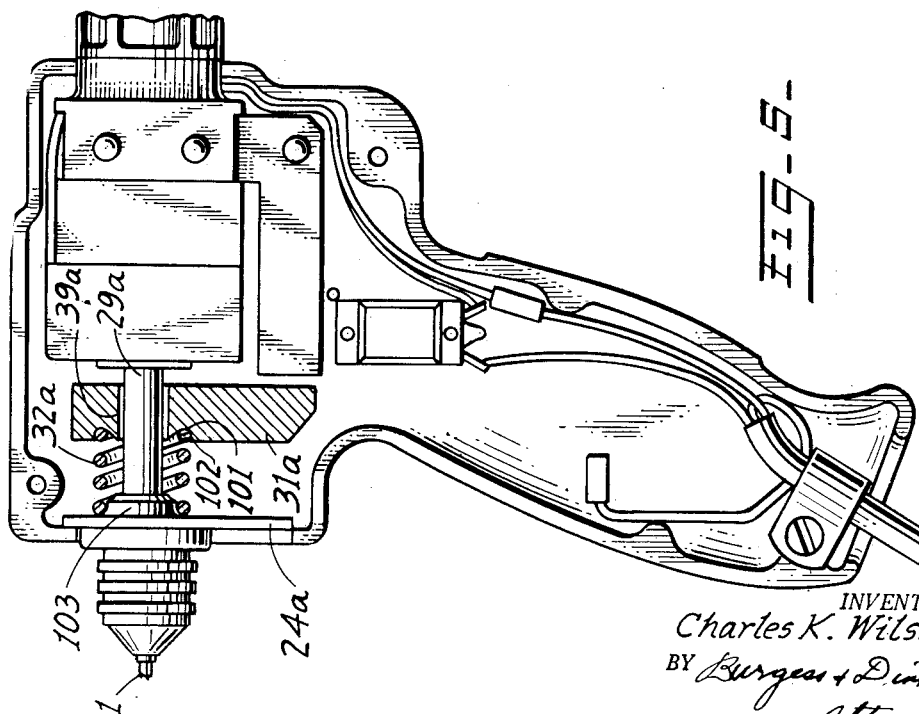
INVENTOR.
Charles K. Wilson
BY Burgess + Dinklage
Attorney

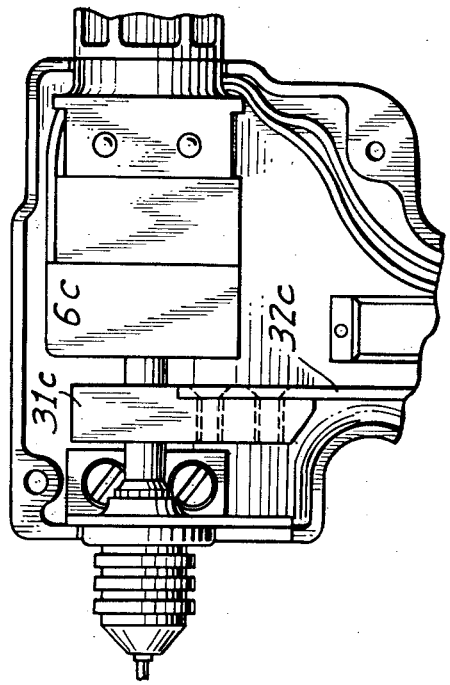
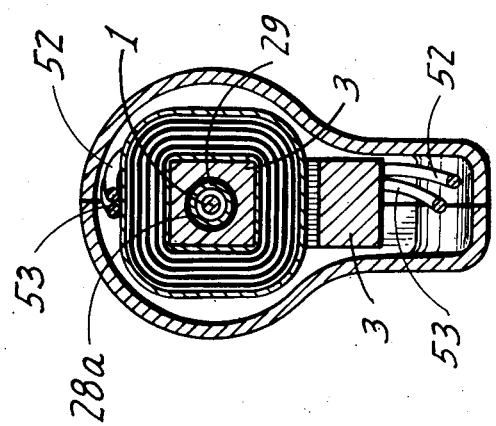

Patented Oct. 23, 1951

2,572,084

UNITED STATES PATENT OFFICE 2,572,084

WELDING ELECTRODE HOLDER CONSTRUCTION

Charles K. Wilson, East Williston, N. Y., assignor to Metallizing Engineering Co. Inc., Long Island City, N. Y., a corporation of New Jersey Application December 7, 1948, Serial No. 64,007

9 Claims. (Cl. 219—8)

This invention relates to improvements in welding electrode holder construction. Welding electrode holders are devices which hold or clamp a suitable welding electrode and make electrical contact therewith. Holders of this type are provided with an electrical cable or other suitable electrical connection from the holder to the source of welding electric current such as a welding generator. Such holders are constructed so that an electrical connection is made between the cable leading from the source of welding current to the clamp device or other means for making an electrical connection to the electrode. Welding electrode holders of the type referred to herein are used either manually or mounted on machines for holding a metal welding electrode in proper welding relation to the metal base member which is to be welded.

For ordinary arc welding, after the arc is struck, the electrode is held with its end spaced apart from the surface of the base metal being welded so that the arc exists across the space between the electrode end and the base. This space and the arc therein is then maintained during the duration of the welding operation.

In some special types of welding, however, it is not desired to maintain continuous, substantially fixed, spaced between the end of the electrode and the base, but rather to rapidly reciprocate the end of the electrode such that the space between the end of the electrode and the base is continuously varied and rapid intermittent contact between the electrode end and the base occurs. For instance, a special type of welding, involving this kind of electrode motion, has been developed for depositing a relatively fine, rough, welded bead of deposited electrode metal on a base for the purpose of rendering the base slipproof when used as a tread or floor for foot traffic. It is welding electrode holders for use with this special type of welding that this invention relates. In the past no suitable electrode holder has existed for this purpose.

One object of this invention comprises, inter alia, an electrically operated oscillating welding electrode holder.

Another object of the invention is a welding electrode holder of the type referred to which will operate from an alternating current supply of at least a number of different frequencies.

A further object of this invention is a welding electrode holder of the type referred to which has no sliding or rotating parts where frictional wear can occur.

These and still further objects of the invention will be more fully understood from the following description read in conjunction with the drawings, illustrating the preferred embodiment of the structure in accordance with the invention in which:

Fig. 1 is a side elevation view of an oscillating welding electrode holder in accordance with the invention;

Fig. 2 is a vertical elevation view of the other side of the structure shown in Fig. 1 with one-half of the casing removed to show the internal parts;

Fig. 3 is a section of the construction shown in Fig. 2 taken in the plane III—III;

Fig. 4 is a side elevation view of a part of the casing of the construction shown in Figs. 1, 2 and 3.

Fig. 5 is a vertical elevation view of a construction illustrating an alternative construction of the device in accordance with my invention;

Fig. 6 is a vertical elevation view illustrating a further embodiment of my invention;

Fig. 8 represents part of a vertical elevation view of a construction in accordance with the invention alternative to that illustrated in the preceding figures.

Figure 7:
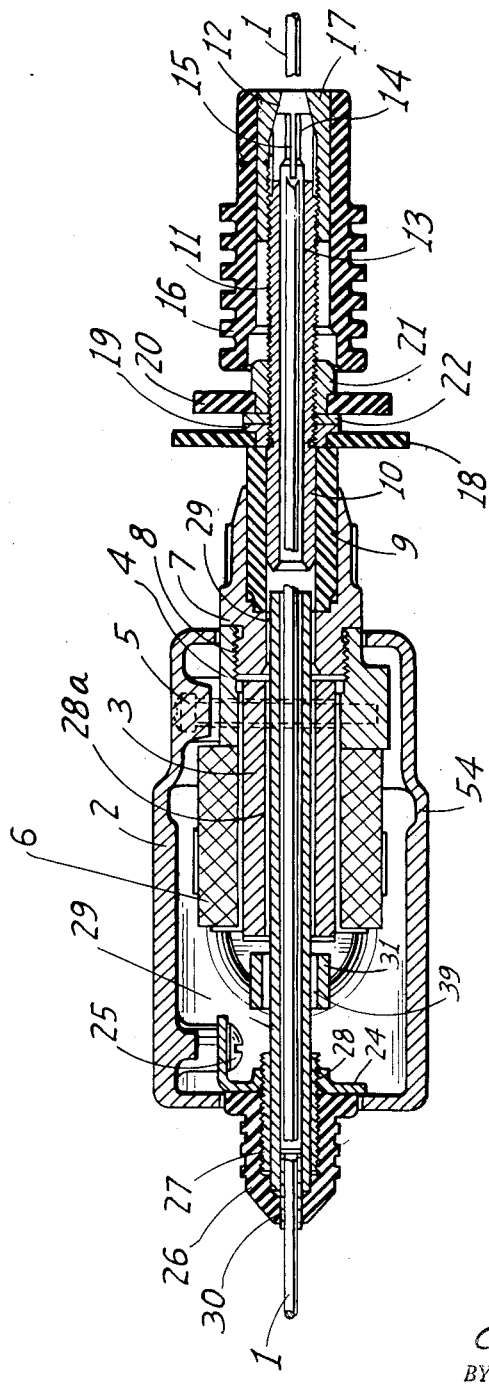
Fig. 7 is a cross-sectional view through part of the construction of Fig. 2 in the plane VII—VII thereof.

Referring particularly to the Figs. 1, 2, 3 and 7, the numeral 1 refers to a welding electrode held by the electrode holder. The half-casing 2 acts as the main support member or frame upon which most of the various parts are mounted. U-shaped magnetic stator core 3 is clamped in U-shaped mounting bracket 4 which is held in place by screws 5. Screws 5 not only hold bracket 4 but clamp stator core 3 therein. An electrical winding 6 is wound around one arm of U-shaped core 3. Winding 6 consists of a large number of turns of insulated electrical conductive wire. Theaded cup 7 is threaded into U-shaped clamping member 4 at threads 8. Tube 9, which is made of insulating material, is pressed into cupped end of cup 7. Spring collet member 10 has threads on part of its outside diameter at 11 and is tapered on its outer surface at 12. Spring collet member 10 has a bore 13 throughout most of its length which connects with bore 14 at its outer end, bore 14 being slightly smaller than bore 13 and being of approximately the same diameter as the diameter of electrode 1. A multiple number of slots 15 extend clear through the end of spring collet member 10 for a short distance adjacent the tapered end thereof.

Collet closer nut 16 is made of electrical insulating material but has a hard metal insert 17 pressed in its end. Insert 17 is threaded or its bore to fit threads 11 and has a tapered forward bore, the taper of which corresponds to the tapered end 12 of spring collet 10.

Electrical insulating washer 18 is pressed on to nut 19 which is threaded on to threads 11 up to and against the end of tube 9. Electrical insulating washer 20 is pressed on to nut 21 which is threaded on to threads 11. Electrical cable lug 22 is connected to insulated electrical cable 23 and is clamped between nut 19 and nut 21.

Bracket 24 is fastened to half-casing 2 by means of screws 25. Electrically insulated electrode guide 26 is molded on to threaded tube 27. Electrode guide 26 is screwed on to bracket 24 by means of threaded tube 27 and threads 28.

Insulating tube 29 extends fom electrode guide 26 through a bore 28a in the upper leg of U-shaped core 3 and through bore 29a in threaded cup member 7. Hardened bushing 30 is pressed into electrode guide 26 and also into the end of tube 29. An electrode conduit for electrode 1 is thus formed by the hole in bushing 30, the bore of tube 29, and the bores in collet member 10.

Armature block 31 is mounted on resilient reed member 32 by means of screws 33. Magnetic stator core 3 and armature block 31 are made of a magnetic material such as soft iron and mild steel so that they form good conductors of magnetic flux but do not form strong permanent magnets. It is preferable to make at least the stator core 3 of a laminated structure built up from a number of different sheets.

Reed member 32 is fastened by means of screws 34 to reed mounting block 35 which in turn is firmly secured to half-casing 2 by screws 36. Supporting leaves 37 and 38 are clamped by means of screws 34 at each side of reed member 32. Armature 31 has a hole at 39 so that it fits over tube 29 with a small amount of clearance around it.

Insulated triple-conductor cord 40 is provided at one end with an ordinary two-prong electrical plug 41. Two of the three conductors are connected to the prongs of plug 41, whereas the third conductor emerges from the side of plug 41 to form pigtail ground connector 42. The other end of triple-conductor cord 40 is clamped by means of clamp 43 and screw 44 to half-casing 2. Emerging from clamped end of triple-conductor cord 40 are the three conductor ends 45, 46 and 47. Conductor end 45 extends through triple-conductor cord 40 and forms pigtail ground connector 42. End 45 is electrically connected to connecting strip 48 which in turn is electrically connected to half-casing 2. Conductor end 46, which extends through cable 40 and connects with one of the prongs in plug 41, is connected to one terminal of switch 49. Switch 49 is a conventional toggle electrical switch, the internal parts of which are not shown. Switch 49 is mounted to half-casing 2 by means of ring nut 50 so that switch handle 51 extends outside of half-casing 2. Electrical coil 6 is provided with two electrically insulated conducting leads thereof 52 and 53. Coil lead 53 connects to the other terminal of switch 49. Coil lead 52 connects to the end of conductor end 47, which in turn leads through conductor 40 to the other prong of plug 41.

Half-casing 54 attaches to half-casing 2. Half-casing 54 is more particularly shown in Fig. 4, together with screws 55 which screw into threaded holes 56 in half-casing 2.

If desired, a resilient insulating sleeve (not shown) may be slipped over cable lug 22.

The electrode holder hereinbefore described is constructed in accordance with one embodiment of my invention which is particularly adaptable for use with alternating current as an energy source for operating the oscillating mechanism.

To prepare the electrode holder, constructed in accordance with the foregoing illustration, for use, it is first connected to a source of alternating electric current having a frequency suitable for the use of the electrode holder, as will be hereinafter more fully described, by means of the electric plug 41. The pigtail ground connector 42 should be connected to an electric ground so that the metal casing of the holder is electrically grounded, thus protecting the operator from any hazard in the event of an accidental internal short circuit. A suitable metal electrode in the form of a rod 1 should be inserted through the electrode holder, through collet 10, so that it extends forward from the end of the collet closer nut 16. This collet closer nut 16 should be tightened so as to clamp the electrode securely in the collet. One terminal of a source of electrical welding current (not shown) should be connected by means of an electrical conductor (not shown) to the metal base member to be welded (not shown). The other terminal of this source of electrical welding current should be connected by means of an electrical conductor to cable 23. Cable 23 connects electrically with electrode 1 through cable lug 22 between nuts 19 and 21 and through spring collet 10 to the electrode 1. Therefore, when electrode 1 is brought into contact with the metal base to be welded, the circuit will become closed and welding current will flow therethrough.

Before contacting electrode 1 with the base, however, the oscillating motion of the electrode holder should be started by closing switch 49 by means of switch handle 51. When this switch is closed, alternating electrical current will flow through one prong of plug 41, through cable 40, through conductor end 46, through switch 49 to coil lead 53 and thence through coil 6, through coil lead 52, through conductor end 47, and thence through cord 40 and through the other prong of plug 41.

When the electrical current flows through coil 6, a magnetic flux is generated which tends to flow through U-shaped stator core 3 and through armature block 31 and across the air gaps between armature block 31 and the two ends of U-shaped core 3. A force is thus generated which deflects armature block 31 toward U-shaped core 3 by deflecting reed 32. Reed 32, with armature block 31 mounted thereon, is so proportioned that it has a natural oscillating frequency which is approximately either the same as, a simple fraction of, or a simple multiple of, the frequency of the alternating current applied to the coil 6. For instance, if a current alternating at 60 cycles per second is applied to coil 6, the assembly of armature block 31 and reed 32 may be designed to oscillate at 60 cycles per second. The 60 cycle current in coil 6 will generate 120 magnetic impulses per second through the magnetic core 3 and armature block 31 since the number of magnetic impulses will be double the number of electrical cycles. Each magnetic impulse will attract armature block 31 toward armature core 3 regardless of the direction of the electrical current causing the impulse. Hence, the armature will be attracted to the core twice for each complete electrical cycle. While the armature block 31 in this example will be attracted toward core 3 120 times per second, it will actually start oscillating 60 times per second since it is so tuned. The oscillation will continue with a relatively large amplitude, however, since the oscillatory motion will be reinforced by every second magnetic impulse.

If an electrical current alternating 30 times per second is applied to coil 6, armature block 31 still will oscillate at the rate of 60 cycles per second in this example since it is so tuned. In this case, 60 magnetic impulses will be generated per second in the core and each magnetic impulse will reinforce oscillation of the armature.

If a current alternating at the rate of 120 cycles per second is applied to coil 6, armature block 31 still will oscillate at the rate of 60 cycles per second in this example since it is so tuned. In this case 240 magnetic impulses per second will be generated by the alternating current and every fourth magnetic impulse will act to reinforce the oscillation of armature block 31.

I have found that the armature block and reed assembly may be so proportioned that it has a natural frequency of either ¼, ⅓, ½, 1, 2, 3, 4, 5, 6, 7 or 8 times the frequency of the applied current to the coil 6, and that the reed assembly will, in all cases, respond substantially to its oscillating frequency and continue to oscillate. I prefer, however, to so proportion the armature block and reed assembly that it has a natural frequency of either ½, 1, or 2 times the frequency of the alternating current applied to coil 6 and I most prefer to so proportion said reed assembly that it has a natural frequency of 1 or 2 times the frequency of the applied alternating current.

In proportioning the armature block and the reed assembly to obtain a desired frequency, I may vary the weight of the block, the length, width, or thickness of the reed, or any several of these dimensions. I have also found it convenient to vary the tuning of the reed assembly by varying the length and sometimes the width and thickness of supporting leaves 37 and 38.

I have found that it is possible to so select the oscillation frequency of the armature block 31 so that it responds to an alternating current varying slightly from integral fractions or multiples of said frequency. For instance, I have found that I can tune the armature assembly to a natural frequency of 55 cycles and that it will then respond to an imposed alternating current with a frequency of 60 cycles and also to an alternating current with a frequency of 50 cycles. I have found this particularly useful since I can then construct a single electrode holder which will operate satisfactorily on either 50 or 60 cycle alternating current. It should be particularly noted that such an electrode holder will also operate satisfactorily on 25 cycle alternating current since the reed assembly will then oscillate at 50 cycles which is two times the current frequency. This is particularly valuable since 25, 50 and 60 cycle currents are the most common ones encountered.

The armature block 31 is made with considerable mass so that as it oscillates it causes the whole electrode holder to oscillate as a reaction to the inertia forces set up thereby. It will thus be seen that the whole electrode holder is caused to oscillate by a mechanism which does not have any sliding or rotating parts which could cause friction or result in wear.

To permit the oscillation of the electrode holder, it is necessary that the whole holder be resiliently mounted. The electrode holder is frequently used as a hand tool and held by the operator. It has been found that the hand of an operator provides a sufficiently resilient mounting for satisfactory operation. If the electrode holder is mounted in a machine of sufficiently rigid construction, it may be necessary to provide special resilient mounting such as a rubber mounting to permit sufficient oscillation of the holder for satisfactory operation. It has been found, however, that when the electrode holder, in accordance with my invention, is mounted on light machines by means of a sufficiently light metal frame work, that the light metal frame work may provide sufficient resiliency of mounting that a special additional resilient mounting is not required.

The armature 31 may be resiliently mounted by other means than the reed 32 if desired. An alternative means for resiliently mounting the armature is illustrated in Fig. 5. The construction shown in Fig. 5 is substantially the same as that shown in Fig. 2 except that the armature block 31a is mounted on a strong coil spring 32a instead of on the reed 32 shown in Fig. 2. An annular groove 101 in armature block 31a provides a space for the end turn of spring 32a. The edge of annular groove 101 is rolled over at 102 to securely hold the spring. The other end of spring 32a is fastened to clamp plate 24a by snapping it in place in an annular groove provided on the outside diameter of extension 103 of plate 24a. Armature 31a is provided with bore 39a which is considerably larger than the outside diameter of tube 29a. The armature 31a does not contact tube 29a but is mounted entirely by spring 32a.

Operation of the electrode holder when constructed as described in connection with Fig. 5 is essentially the same as that previously described in connection with the construction shown in Figs. 1, 2 and 3. In this case, however, I adjust the frequency of oscillation of armature 31a by varying its weight or by varying the proportions or the material of spring 32a.

The preceding descriptions, as hereinabove set forth, have been related to an electrode holder comprising one embodiment of my invention which is for use with an alternating current as the energy source for the oscillating mechanism. I may also use a direct current as a source of energy for the oscillating mechanism. In this case, however, the construction is varied somewhat from the description previously given. The construction illustrated in Fig. 6 is in many ways similar to that illustrated in Fig. 2 except that the construction in Fig. 6 has been varied slightly to adapt the electrode holder for use with a direct current as a source of energy for the oscillating mechanism.

Referring to Fig. 6, electrical coil 6b is mounted on magnetic core 3b which in turn is mounted on half-casing 2b. Armature block 31b is mounted on resilient reed 32b which in turn is mounted on case 2b with a construction similar to that previously described.

Switch 49b is a conventional switch similar to switch 49 as illustrated in Fig. 2 except that it has an extended base upon which are mounted resilient metal strips 201 and 202. At the end of strip 202 is contact button 203, and at the end of strip 201 is contact button 204.

Conductor end 46b is electrically connected to the other end of strip 202. The other end of strip 201 is electrically connected inside switch 49b to one pole of said switch. The other terminal of switch 49b is connected to coil lead 53b. The connection of this construction electrically to a source of current is the same as that previously described in connection with the embodiment of my invention illustrated in Fig. 2 except that the metallic strips 201 and 202, together with their contact points 203 and 204, have been interposed in series in the electrical circuit of coil 6b.

Small stud 204a is fastened to reed 32b through a hole therein by means of nuts 205.

In operation the electrode holder is connected by means of cord 40b to a source of direct current. When switch 49b is closed, current flows through the circuit to coil 6b energizing it. Magnetic flux is thus generated in core 3b and armature 31b is deflected toward core 3b. As armature 31b approaches the core, it deflects reed 32b so that eventually stud 204a contacts strip 201 causing it to deflect sufficiently to move contact button 204 away from contact button 203 thus breaking the electric circuit and deenergizing coil 6b. Armature 31b thereafter moves away from core 3b and, due to its resilient mounting, oscillates at its natural frequency. However, as it moves away stud 204 ceases to contact strip 201 which resumes its original position and reforms contact between buttons 203 and 204 hence re-establishing the circuit and re-energizing coil 6b. The armature 31b will, therefore, continue to oscillate at its natural frequency.

If desired a capacitor and resistor may be wired in shunt across metal strips 201 and 202 (Fig. 6) to reduce sparking at the contact buttons.

It should be noted that in either embodiment of my invention wherein either the current source is an alternating current or a direct current that the construction in accordance with my invention utilizes an interrupted electric current to produce a pulsating magnetic field and that the resilient armature assembly is so designed as to utilize these magnetic pulses to cause it to oscillate at its tuned frequency.

Specifically referring to Fig. 8, an alternative construction is shown for the obtaining of magnetic impulse oscillation of the armature. As there illustrated, a coil 6c is provided together with an armature 31c mounted on reed 32c. As may be seen from this construction, no core is provided within the coil 6c. The magnetic attraction of the armature 31c and the impulse created oscillation thereof is solely effected by the magnetic field set up by the coil.

To operate the electrode holder in accordance with my invention to carry out the special type welding for which this holder is best suited, it is first prepared for operation as described hereinabove by properly connecting it to a source of alternating current for the operation of the oscillatory mechanism and also by connecting it to one lead from a source of welding current. The welding current may be either alternating current or direct current. The oscillation of the electrode holder is then started by throwing switch lever 51. The electrode holder is then started in operation and moved into position with respect to the base metal to be welded so that the end of the electrode 1 contacts the base metal and the welding operation will start. The tool is usually moved approximately parallel with the surface of the base metal during operation so that a bead of deposited electrode metal is formed along the base metal. During the formation of this bead, the end of the electrode contacts the base metal and then, due to the oscillatory motion of the electrode holder, it moves away from the base metal and thereafter recontacts the base metal and so on as the electrode holder oscillates. Means must be provided in the mounting of this electrode holder for feeding it toward the surface of the base sufficiently to make up for the amount of electrode rod consumed in the operation. The operator may stop the operation by moving the end of the electrode away from the base and extend more rod from the electrode holder whenever desired by loosening collet nut 16 and pushing the electrode rod 1 from the rear of electrode rod adjacent electrode guide 26. If individual short length rods are used, a new electrode rod may be inserted into the electrode holder through the electrode guide 26 whenever needed. Such new rod may be used to push forward the partially consumed rod when required.

As may be seen from the foregoing, this invention broadly embraces the improvement in a welding electrode holder of an electric coil, mounted on said holder in fixed relation to electrode securing means thereof, and magnetizable armature means positioned relative to said coil to be magnetized upon electric impulse energization thereof for magnetic attraction thereby, said armature means being resiliently mounted for oscillation on said holder at pre-tuned frequency of oscillation to thereby effect upon oscillation of said armature means oscillating motion of at least the electrode securing means of said holder.

Within the preferred scope of the invention, generically two alternative constructions are provided. The first includes current feeding means for providing an uninterrupted conductor to the electric coil from the source of electric current of pre-determined impulse frequency with the armature means resiliently mounted for oscillation at a predetermined frequency of oscillation of $f$ times the impulse frequency whereby $f$ may be numerically one of $\frac{1}{4}$, $\frac{1}{3}$, $\frac{1}{2}$, 1, 2, 3, 4, 5, 6, 7, and 8 but preferably one of $\frac{1}{2}$, 1 and 2. This embodiment is substantially useful in connection with alternating current of predetermined impulse frequency. The alternative construction in accordance with the invention is one including current feeding means having current interruptor means for providing an interrupted current to the electric coil of predetermined impulse frequency with the armature means also in this case resiliently mounted for oscillation at a predetermined frequency of oscillation of $f$ times the impulse frequency, $f$ being numerically one of the aforementioned values. This construction is primarily adapted for use with direct current. The same, however, may be used also for alternating current, though in the latter case it is advisable for best operation to appropriately tune the interruptor to the impulse frequency of the alternating current to avoid as much as possible a dampening effect.

The foregoing description is furnished by way of illustration and not of limitation, and it is therefore my intention that the invention be limited only by the appended claims or their equivalents wherein I have endeavored to claim broadly all inherent novelty.

I claim:

1. In a welding electrode holder, the improvement comprising an electric coil, mounted on said holder in fixed relation to electrode securing means thereof, and magnetizable armature means positioned relative to said coil to be magnetized upon electric impulse energization thereof for magnetic attraction thereby, said armature means being resiliently mounted for oscillation on said holder at pre-tuned frequency of oscillation to thereby effect upon oscillation of said armature means oscillating motion of at least the electrode securing means of said holder.

2. The improvement in accordance with claim 1 in which there is included current feeding means for providing an uninterrupted conductor to said coil from a source of electric current of predetermined impulse frequency, and in which said armature means are resiliently mounted for oscillation at a predetermined frequency of oscillation of about $f$ times said impulse frequency, $f$ being numerically one of ¼, ⅓, ½, 1, 2, 3, 4, 5, 6, 7, and 8.

3. The improvement in accordance with claim 2 in which there are additionally provided magnetizable means positioned relative to said coil to be magnetized upon electric impulse energization thereof, and in which said armature means are positioned relative to said magnetizable means for magnetic attraction thereby upon electric impulse energization of said coil.

4. The improvement in accordance with claim 3 in which $f$ is one of ½, 1 and 2.

5. In a welding electrode holder, the improvement comprising an electric coil, mounted on said holder in fixed relation to electrode securing means thereof, and magnetizable armature means positioned relative to said coil to be magnetized upon electric impulse energization thereof for magnetic attraction thereby, said armature means being resiliently mounted for oscillation on said holder at pre-tuned frequency of oscillation of about $f$ times said impulse frequency, $f$ being numerically one of ¼, ⅓, ½, 1, 2, 3, 4, 5, 6, 7, and 8, to thereby effect upon oscillation of said armature means oscillating motion of at least the electrode securing means of said holder, current feeding means for providing an uninterrupted conductor to said coil from a source of electric current of predetermined impulse frequency, magnetizable means positioned relative to said coil to be magnetized upon electric impulse energization thereof, said armature means being positioned relative to said magnetizable means for magnetic attraction thereby upon electric impulse energization of said coil, said armature being resiliently mounted by way of a spring element freely oscillatable at one end and secured to said holder at the other end, said spring element carrying said armature at said oscillatable end and said armature being secured to said holder by way of the holder-secured end of the spring element.

6. Improvement in accordance with claim 5 in which $f$ is one of ½, 1 and 2.

7. Improvement in accordance with claim 1 in which there is included current feeding means having current interruptor means for providing an interrupted current to said coil of predetermined impulse frequency and in which said armature means are resiliently mounted for oscillation at a predetermined frequency of oscillation of about $f$ times said impulse frequency, $f$ being numerically one of ¼, ⅓, ½, 1, 2, 3, 4, 5, 6, 7, and 8.

8. The improvement in accordance with claim 7 in which there are additionally provided magnetizable means positioned relative to said coil to be magnetized upon electric impulse energization thereof, and in which said armature means are positioned relative to said magnetizable means for magnetic attraction thereby upon electric impulse energization of said coil.

9. Improvement in accordance with claim 8 in which said armature means are resiliently mounted by way of a spring element freely oscillatable at one end and secured to said holder at the other end, in which said spring element carries said armature means at said oscillatable end, in which said armature means are secured to said holder by way of the holder-secured end of said spring element, and in which said spring element carries current interruptor means actuated by the oscillation of said armature means.

CHARLES K. WILSON.

REFERENCES CITED

The following references are of record in the file of this patent:

UNITED STATES PATENTS

| Number | Name | Date |
| --- | --- | --- |
| 1,984,809 | Re Qua | Dec. 18, 1934 |
| 2,080,273 | Holmes | May 11, 1937 |
| 2,108,637 | Bartgis | Feb. 15, 1938 |
| 2,383,383 | Harding | Aug. 21, 1945 |
| 2,399,212 | Dawson et al. | Apr. 30, 1946 |
| 2,399,771 | Tyrner | May 7, 1946 |